(12) United States Patent
Colak et al.

(10) Patent No.: US 11,487,058 B2
(45) Date of Patent: Nov. 1, 2022

(54) METHOD FOR MANUFACTURING OPTICAL DEVICE STRUCTURES

(71) Applicant: Applied Materials, Inc., Santa Clara, CA (US)

(72) Inventors: Levent Colak, Santa Clara, CA (US); Ludovic Godet, Sunnyvale, CA (US); Andre P. Labonte, Mechanicville, NY (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 254 days.

(21) Appl. No.: 16/993,067

(22) Filed: Aug. 13, 2020

(65) Prior Publication Data

US 2022/0050241 A1    Feb. 17, 2022

(51) Int. Cl.
*F21V 8/00*    (2006.01)

(52) U.S. Cl.
CPC ......... *G02B 6/0065* (2013.01); *G02B 6/0016* (2013.01); *G02B 6/0038* (2013.01)

(58) Field of Classification Search
CPC ........ G02B 5/1857; G02B 2006/12173; G02B 2006/12107; G02B 2006/12176; F21S 43/239; F21V 5/04; F21V 8/00
See application file for complete search history.

(56) References Cited

U.S. PATENT DOCUMENTS

| | | | | |
|---|---|---|---|---|
| 4,846,552 A * | 7/1989 | Veldkamp | ............ | G02B 5/1876 250/492.1 |
| 4,936,665 A * | 6/1990 | Whitney | ............ | G02B 27/0075 359/741 |
| 5,007,708 A * | 4/1991 | Gaylord | ............... | G02B 5/1809 359/569 |
| 6,327,086 B1 | 12/2001 | Unno | | |
| 2001/0026399 A1 | 10/2001 | Nakabayashi et al. | | |
| 2001/0055826 A1 * | 12/2001 | Chiba | ................. | G03F 7/70316 438/24 |
| 2004/0005769 A1 * | 1/2004 | Mikolas | ............... | B24B 37/013 257/E21.244 |
| 2007/0238031 A1 * | 10/2007 | Lee | .......................... | H01L 45/06 430/5 |
| 2009/0170038 A1 * | 7/2009 | Amako | ............... | G03F 7/70408 430/321 |
| 2009/0289205 A1 * | 11/2009 | Moriya | ................ | G02B 5/1838 250/504 R |
| 2013/0193106 A1 | 8/2013 | Chen et al. | | |
| 2014/0285891 A1 | 9/2014 | Heitzmann | | |
| 2020/0004029 A1 * | 1/2020 | Godet | ....................... | G03F 1/80 |
| 2020/0135482 A1 | 4/2020 | Godet et al. | | |

OTHER PUBLICATIONS

International Search Report issued to PCT/US2021/043381 dated Nov. 19, 2021.

* cited by examiner

*Primary Examiner* — William J Carter

(74) *Attorney, Agent, or Firm* — Patterson + Sheridan, LLP

(57) ABSTRACT

Embodiments described herein provide for methods of forming optical device structures. The methods utilize rotation of a substrate, to have the optical device structures formed thereon, and tunability of etch rates of a patterned resist disposed over the substrate and one of a device layer or the substrate to form the optical device structures without multiple lithographic patterning steps and angled etch steps.

20 Claims, 8 Drawing Sheets

METHOD FOR MANUFACTURING OPTICAL DEVICE STRUCTURES

BACKGROUND

Field

Embodiments of the present invention generally relate to optical devices for augmented, virtual, and mixed reality. More specifically, embodiments described herein provide for forming blazed optical device structures.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment. Optical devices may require structures having blazed angles relative to the surface of the optical device substrate. Conventionally, fabricating blazed optical device structures using one or more angled etch tools requires multiple lithographic patterning steps and angled etch steps. The multiple lithographic patterning steps and angled etch steps increase fabrication time and increase cost.

Accordingly, what is needed in the art are improved methods of forming optical devices including blazed optical device structures with angled etch tools.

SUMMARY

In one embodiment, a method is provided. The method includes positioning a substrate at a first rotation angle $\phi_1$ in the path of a beam. The beam is configured to be projected to a surface of the substrate at a beam angle $\vartheta$ relative to a surface normal of the substrate. A patterned resist is formed over the substrate where the patterned resist includes two or more resist structures and one or more gaps. Each of the resist structures has a width and each of the gaps is defined by adjacent resist structures and has a linewidth defined by the adjacent resist structures. The method includes etching the substrate positioned at the first rotation angle $\phi_1$ with the beam and rotating the substrate to a second rotation angle $\phi_2$ and etching sidewalls of the resist structures oriented toward the beam such that the width of the resist structures decreases and the linewidth of the gaps increases. The method further includes rotating the substrate to the first rotation angle $\phi_1$ and etching the substrate at the first rotation angle $\phi_1$ with the beam and forming two or more optical device structures in the substrate. The forming the optical device structures includes repeating the rotating the substrate to the second rotation angle $\phi_2$ and the etching sidewalls of the resist structures with the beam and the rotating the substrate to the first rotation angle $\phi_2$ and the etching the substrate with the beam until the resist structures are removed or the linewidth of the gaps has a predetermined linewidth.

In another embodiment, a method is provided. The method includes positioning a substrate at a first rotation angle $\phi_1$ in the path of a beam. The beam is configured to be projected to a surface of the substrate at a beam angle $\vartheta$ relative to a surface normal of the substrate. A device layer is formed over the substrate and a patterned resist is formed on the device layer. The patterned resist includes two or more resist structures and one or more gaps. Each of the resist structures has a width and each of the gaps is defined by adjacent resist structures and has a linewidth defined by the adjacent resist structures. The method includes etching the device layer with the substrate positioned at the first rotation angle $\phi_1$ with the beam and rotating the substrate to a second rotation angle $\phi_2$ and etching sidewalls of the resist structures oriented toward the beam such that the width of the resist structures decreases and the linewidth of the gaps increases. The method further includes rotating the substrate to the first rotation angle $\phi_1$ and etching the device layer at the first rotation angle $\phi_1$ with the beam and forming two or more optical device structures in the device layer. The forming the optical device structures includes repeating the rotating the substrate to the second rotation angle $\phi_2$ and the etching sidewalls of the resist structures with the beam and the rotating the substrate to the first rotation angle $\phi_2$ and the etching the device layer with the beam until the resist structures are removed or the linewidth of the gaps has a predetermined linewidth.

In yet another embodiment, a method is provided. The method includes positioning a substrate at a first rotation angle $\phi_1$ in the path of a beam. The beam is configured to be projected to a surface of the substrate at a beam angle $\vartheta$ relative to a surface normal of the substrate. A patterned resist is formed over the substrate where the patterned resist includes two or more resist structures and one or more gaps. Each of the resist structures has a width and each of the gaps is defined by adjacent resist structures and has a linewidth defined by the adjacent resist structures. The substrate is etched by the beam generated by a substrate etch chemistry and the resist structures are etched by the beam generated by a resist etch chemistry different than the substrate etch chemistry. The method further includes etching the substrate positioned at the first rotation angle $\phi_1$ with the beam generated by the substrate etch chemistry and rotating the substrate to a second rotation angle $\phi_2$ and etching sidewalls of the resist structures with the beam at the beam angle $\vartheta$. The beam generated by the resist etch chemistry etches sidewalls of resist structures oriented toward the beam such that the width of the resist structures decreases and the linewidth of the gaps increases. The method further includes rotating the substrate to the first rotation angle $\phi_1$ and etching the substrate at the first rotation angle $\phi_1$ with the beam generated by the substrate etch chemistry and forming two or more optical device structures in the substrate. The forming the optical device structures comprises repeating the rotating the substrate to the second rotation angle $\phi_2$ and the etching sidewalls of the resist structures with the beam generated by the resist etch chemistry and rotating the substrate to the first rotation angle $\phi_1$ and the etching the substrate with the beam generated by the substrate etch chemistry until the resist structures are removed or the linewidth of the gaps has a predetermined linewidth.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present invention generally relate to optical devices for augmented, virtual, and mixed reality. More specifically, embodiments described herein provide for methods of forming optical device structures. The methods utilize rotation of a substrate, to have the optical device structures formed thereon, and tunability of etch rates of a patterned resist disposed over the substrate and one of a device layer or the substrate to form the optical device structures without multiple lithographic patterning steps and angled etch steps.

In one embodiment, the method includes positioning a substrate at a first rotation angle $\phi_1$ in a path of a beam, the beam configured to be projected to a surface of the substrate at a beam angle $\vartheta$ relative to a surface normal of the substrate. The substrate has a patterned resist formed thereover. The patterned resist includes two or more resist structures. Each of the resist structures has a width and one or more gaps. Each of the gaps is defined by adjacent resist structures and having a linewidth defined by the adjacent resist structures. The substrate positioned at the first rotation angle $\phi_1$ is etched with the beam. The substrate is rotated to a second rotation angle $\phi_2$ and sidewalls of the resist structures are etched with the beam at the beam angle $\vartheta$ such that the width of the resist structures decreases and the linewidth of the gaps increases. The substrate is rotated to the first rotation angle $\phi_1$ and the substrate is etched at the first rotation angle $\phi_1$ with the beam. Two or more optical device structures are formed in the substrate. The forming the optical device structures includes repeating the rotating the substrate to the second rotation angle $\phi_2$ and the etching sidewalls of the resist structures with the beam, and the rotating the substrate to the first rotation angle $\phi_1$ and the etching the substrate with the beam until the resist structures are removed or the linewidth of the gaps has a predetermined linewidth.

Figure 1A:
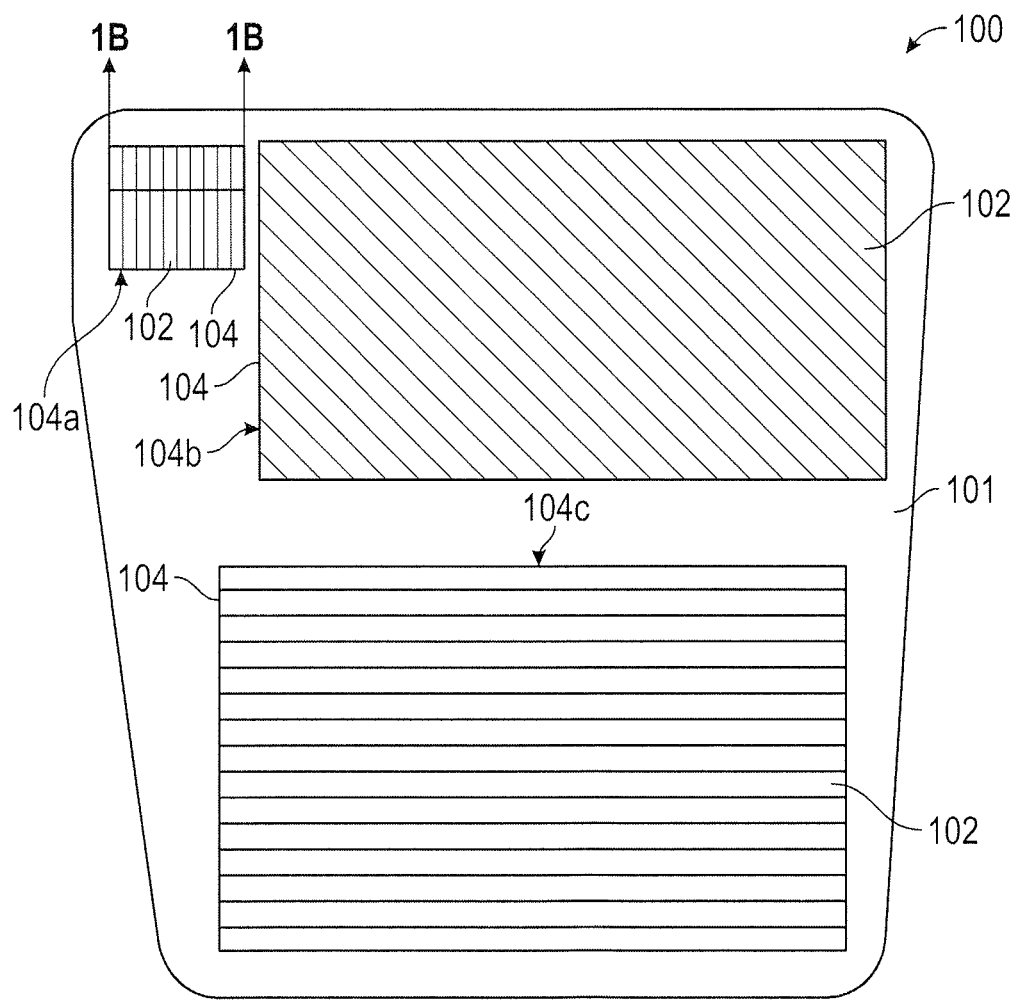
FIG. 1A is a perspective, frontal view of an optical device according to embodiments described herein.
Figure 1B:
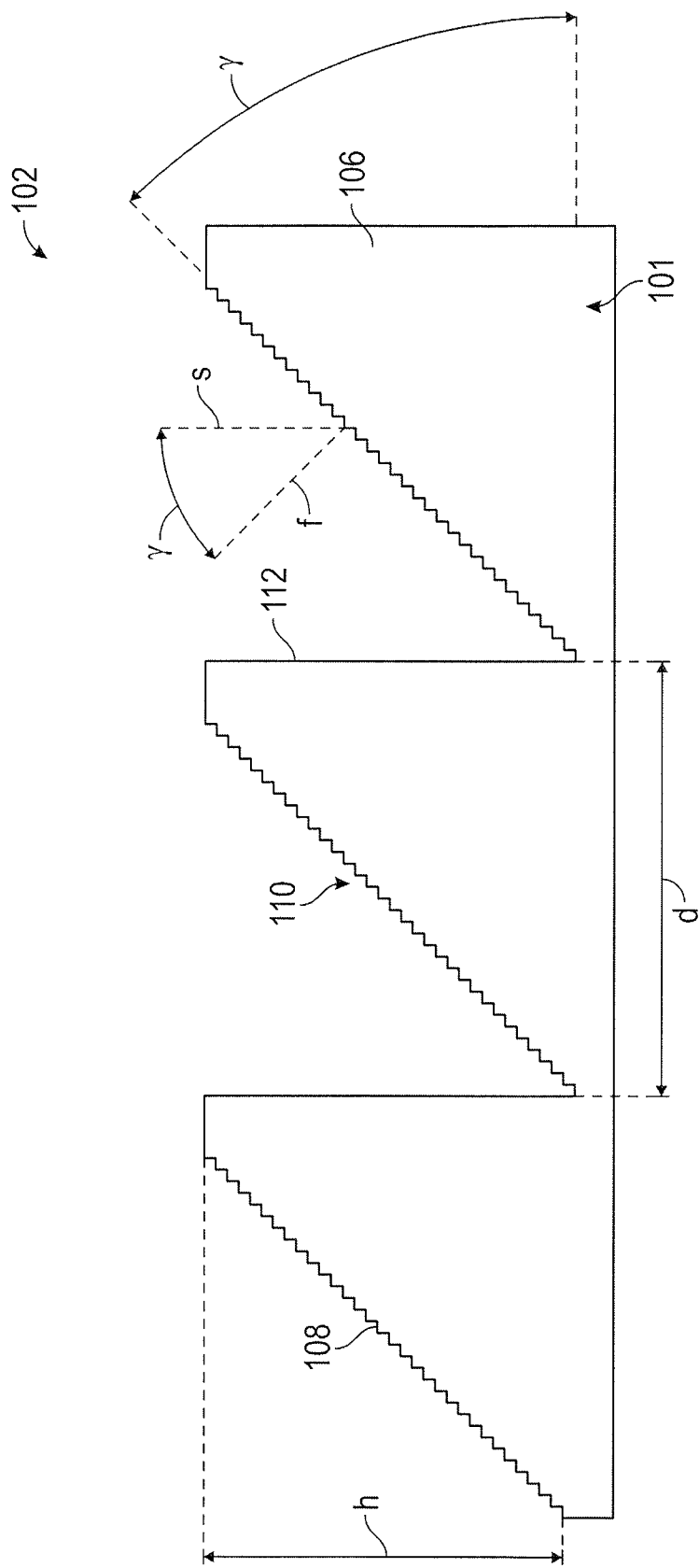
FIG. 1B and FIG. 1C are schematic, cross-sectional views of a plurality of device structures according to embodiments described herein.
Figure 1C:
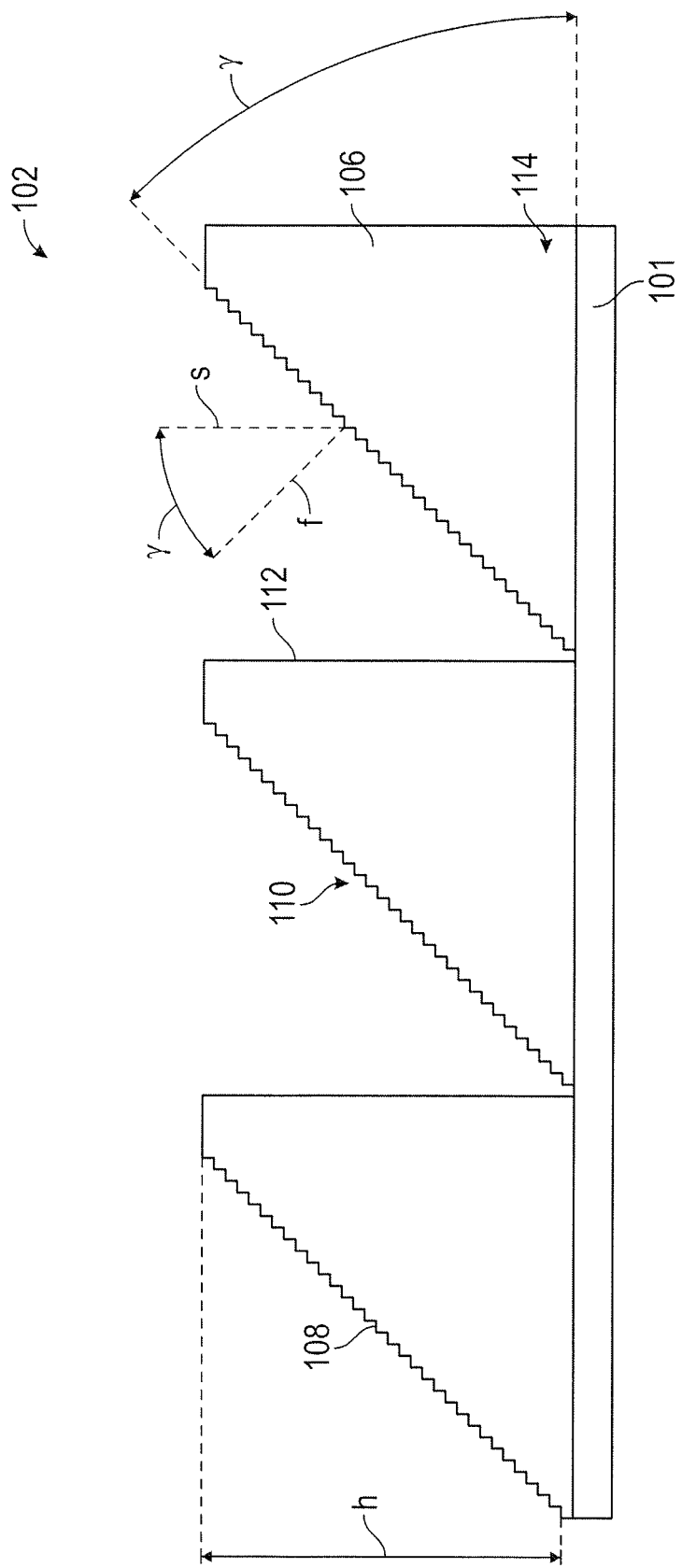

FIG. 1A illustrates a perspective, frontal view of an optical device 100. It is to be understood that the optical device 100 described below is an exemplary optical device. In one embodiment, which can be combined with other embodiments described herein, the optical device 100 is a waveguide combiner, such as an augmented reality waveguide combiner. In another embodiment, which can be combined with other embodiments described herein, the optical device 100 is a flat optical device, such as a metasurface. The optical device 100 includes a plurality of device structures 102 disposed in (as shown in FIG. 1B) or on (as shown in FIG. 1C) a substrate 101. As shown in FIG. 1C, the device structures 102 are formed in a device layer 114 formed on the substrate 101. The device structures 102 may be nanostructures having sub-micron dimensions, e.g., nano-sized dimensions, such as critical dimensions less than 1 μm. In one embodiment, which can be combined with other embodiments described herein, regions of the device structures 102 correspond to one or more gratings 104, such as a first grating 104a, a second grating 104b, and a third grating 104c. In one embodiment, which can be combined with other embodiments described herein, the optical device 100 is a waveguide combiner that includes at least the first grating 104a corresponding to an input coupling grating and the third grating 104c corresponding to an output coupling grating. The waveguide combiner according to the embodiment, which can be combined with other embodiments described herein, may include the second grating 104b corresponding to an intermediate grating.

FIG. 1B and FIG. 1C are schematic, cross-sectional view of a plurality of device structures 102. In one embodiment, which can be combined with other embodiments described herein, the device structures 102 are blazed device structures 106 of a flat optical device, such as a metasurface. The method 400 described herein forms the blazed devices structures 106. In another embodiment, which can be combined with other embodiments described herein, the device structures 102 are blazed device structures 106 of a waveguide combiner, such as an augmented reality waveguide combiner. The waveguide combiner according to the embodiment, which can be combined with other embodiments described herein, may include blazed devices structures 106 in at least one of the gratings 104. Each of the blazed device structures 106 includes a blazed surface 108, a sidewall 112, a depth h, and a linewidth d. The blazed surface 108 has a plurality of steps 110. In one embodiment, which can be combined with other embodiments described herein, the blazed surface 108 includes at least 16 steps 110, such as greater than 32 steps 110, for example 64 steps 110. The blazed surface 108 has a blaze angle γ. The blaze angle γ is the angle between the blazed surface 108 and the surface parallel p of the substrate 101 and the angle between the surface normal of the substrate 101 and facet normal f of the blazed surface 108. The depth h corresponds to the height of the sidewall 112 and the linewidth d corresponds to the distances between sidewalls 112 of adjacent blazed device structures 106.

In one embodiment, which can be combined with other embodiments described herein, the blaze angle γ of two or more blazed devices structures 106 are different. In another embodiment, which can be combined with other embodiments described herein, the blaze angle γ of two or more blazed devices structures 106 are the same. In one embodiment, which can be combined with other embodiments described herein, the depth h of two or more blazed devices structures 106 are different. In another embodiment, which can be combined with other embodiments described herein, the depth h of two or more blazed devices structures 106 are the same. In one embodiment, which can be combined with other embodiments described herein, the linewidth d of two or more blazed devices structures 106 are different. In another embodiment, which can be combined with other embodiments described herein, the linewidths d of one or more blazed devices structures 106 are the same.

The substrate 101 may also be selected to transmit a suitable amount of light of a desired wavelength or wavelength range, such as one or more wavelengths from about 100 to about 3000 nanometers. Without limitation, in some embodiments, the substrate 101 is configured such that the substrate 101 transmits greater than or equal to about 50% to about 100% of an IR to UV region of the light spectrum. The substrate 101 may be formed from any suitable material, provided that the substrate 101 can adequately transmit light in a desired wavelength or wavelength range and can serve as an adequate support for the blazed devices structures 106 (when the blazed devices structures 106 are formed in the device layer 114) described herein. Substrate selection may include substrates of any suitable material, including, but not limited to, amorphous dielectrics, non-amorphous dielectrics, crystalline dielectrics, silicon oxide, polymers, and combinations thereof. In some embodiments, which can be combined with other embodiments described herein, the substrate 101 includes a transparent material. Suitable examples may include an oxide, sulfide, phosphide, telluride or combinations thereof. In one example, the substrate 101 includes silicon (Si), silicon dioxide ($SiO_2$), germanium (Ge), silicon germanium (SiGe), sapphire, and high-index transparent materials such as high-refractive-index glass.

In some embodiments, which can be combined with other embodiments described herein, the device layer 114 includes, but is not limited to, one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials. In some embodiments, which can be combined with other embodiments described herein, the material of the device layer 114 may have a refractive index between about 1.5 and about 2.65. In other embodiments, which can be combined with other embodiments described herein, the material of the device layer 114 may have a refractive index between about 3.5 and about 4.0.

Figure 2:
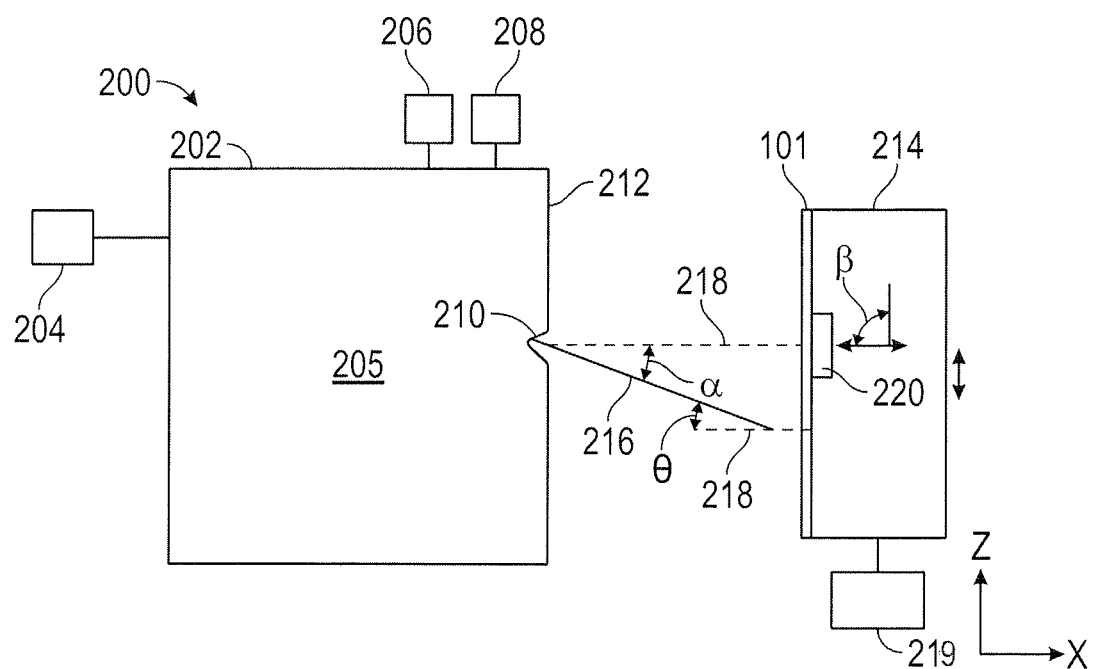
FIG. 2 is a schematic, side view of an angled etch system according to embodiments described herein.

FIG. 2 is a schematic, side view of an angled etch system 200. It is to be understood that the angled etch system 200 described below is an exemplary angled etch system and other angled etch systems may be used with or modified to fabricate the optical devices 100 having blazed device structures 106 in accordance with the embodiments of the disclosure.

The angled etch system 200 includes an ion beam chamber 202. A power source 204, a first gas source 206, and a second gas source are coupled to the ion beam chamber 202. In one embodiment, which can be combined with other embodiments described herein, the power source 204 is a radio frequency (RF) power source. The first gas source 206 is in fluid communication with the interior volume 205 of ion beam chamber 202. The first gas source 206 is an inert gas source which supplies an inert gas, such as argon, hydrogen, or helium, to the ion beam chamber 202. The second gas source 208 is in fluid communication with the interior volume 205 of ion beam chamber 202. The second gas source 208 is a process gas source which supplies a process gas to the ion beam chamber 202. The process gas includes, but is not limited to, one or more of a chlorine containing gas, a fluorine containing gas, a bromine containing gas, an oxygen containing gas, a silicon containing gas, nitrogen containing gas, hydrogen containing gas, or the like. In the embodiments of the method 400 described herein, which can be combined with other embodiments described herein, two or more process gases may be utilized.

A first process gas may have a substrate etch chemistry that is selective to a resist material. The etch selectivity of the first process gas having the substrate etch chemistry provides for a selectivity of the substrate material to the resist material (described below) of about 5:1 or greater. The etch selectivity of the first process gas having the device material etch chemistry provides for a selectivity of the device material to a resist material of about 5:1 or greater. In one embodiment, which can be combined with other embodiments described herein, the substrate etch chemistry includes a chlorine containing gas, a fluorine containing gas, or a combination thereof. In another embodiment, which can be combined with other embodiments described herein, the device material etch chemistry includes the chlorine containing gas, the fluorine containing gas, or the combination thereof.

A second process gas may have a resist etch chemistry that is selective to the substrate material or device material. The etch selectivity of the second process gas having the resist etch chemistry provides for a selectivity of the resist material to the substrate material of about 10:1 or greater or a selectivity of the resist material to the device material of about 10:1 or greater. In one embodiment, which can be combined with other embodiments described herein, the resist etch chemistry includes oxygen gas ($O_2$) and carbon tetrafluoride ($CF_4$). In another embodiment, which can be combined with other embodiments described herein, the resist etch chemistry includes argon gas (Ar), nitrogen gas ($N_2$), and hydrogen gas ($H_2$). In yet another embodiment, which can be combined with other embodiments described herein, the resist etch chemistry includes nitrogen gas ($N_2$) and hydrogen gas ($H_2$).

In operation, a plasma is generated in the ion beam chamber 202 by applying RF power via the power source 204 to the inert gas and the process gas provided to the interior volume 205 of ion beam chamber 202 to generate a plasma. Ions of the plasma of the inert gas and the process gas are extracted through an aperture 210 of an extraction plate 212 to generate an ion beam 216. The aperture 210 of the ion beam chamber 202 is operable to direct the ion beam 216 at an angle α relative to a datum plane 218 oriented normal to the substrate 101 (i.e., the surface normal s). The ion beam 216 includes, but is not limited to, a spot beam, a ribbon beam, or a full substrate-size beam. The ion beam 216 generated includes one of the substrate etch chemistry, the device material etch chemistry, or the resist etch chemistry dependent on the process gas utilized.

The substrate 101 is retained on a platen 214 coupled to a first actuator 219. The first actuator 219, which may be a linear actuator, a rotary actuator, a stepper motor, or the like, is configured to move the platen 214 in a scanning motion along a y-direction and/or a z-direction. In one embodiment, which can be combined with other embodiments described herein, the first actuator 219 is further configured to tilt the platen 214 such that the substrate 101 is positioned at a tilt angle β relative to the x-axis of the ion beam chamber 202. The angle α and tilt angle β result in a beam angle θ relative to the datum plane 218 normal to the substrate 101. A second actuator 220 may also be coupled to the platen 214 to rotate the substrate 101 about the x-axis of the platen 214.

Figure 3:
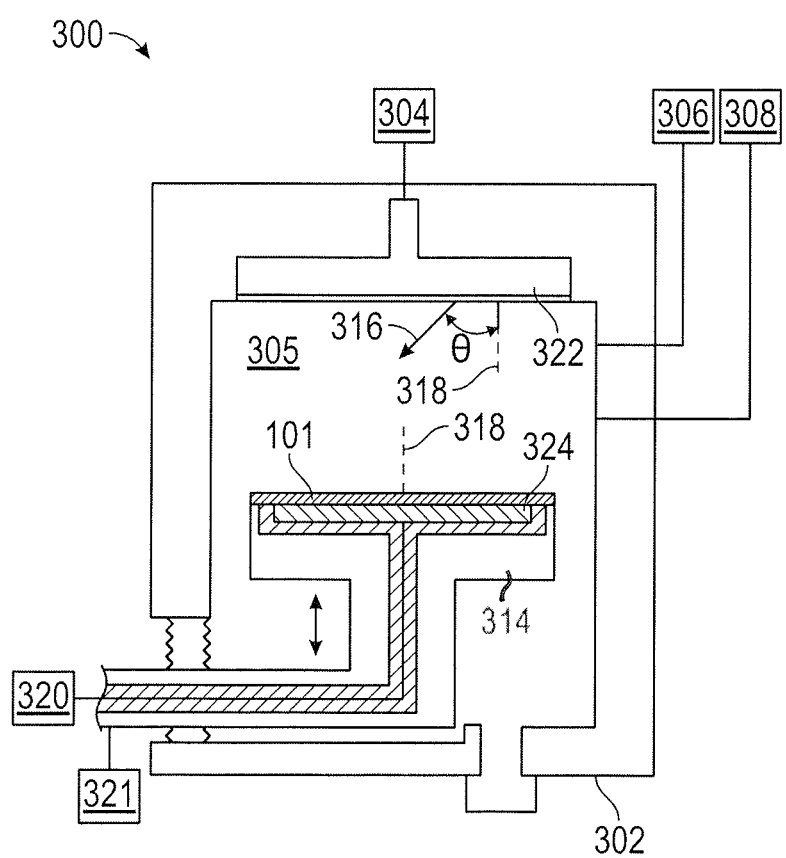
FIG. 3 is a schematic cross-sectional view of angled etch system according to embodiments described herein.

FIG. 3 is a schematic, cross-sectional view of angled etch system 300. It is to be understood that the angled etch system 300 described below is an exemplary angled etch system and other angled etch systems may be used with or modified to fabricate the optical devices 100 having blazed device structures 106 in accordance with the embodiments of the disclosure.

The angled etch system 300 includes an electron beam chamber 302. A power source 304, a first gas source 306, and a second gas source 308 are coupled to the electron beam chamber 302. The first gas source 306 and the second gas source 308 are in fluid communication with the interior volume 305 of electron beam chamber 302. For example, the first gas source 306 and the second gas source 308 may extend through the electrode 322 or the electrode 322 may include a plurality of apertures to function as a gas delivery showerhead. The first gas source 306 is an inert gas source which supplies the inert gas (as described above) to the electron beam chamber 302. The second gas source 308 is a process gas source (as described above) which supplies a process gas to the ion beam chamber 202. In the embodiments of the method 400 described herein, which can be combined with other embodiments described herein, two or more process gases may be utilized. The two or more process gases include the substrate etch chemistry, the device material etch chemistry, and the resist etch chemistry described herein.

The substrate 101 is retained on a platen 314 coupled to a first actuator 321. The first actuator 321, which may be a linear actuator, a rotary actuator, a stepper motor, or the like, is configured to raise and lower the platen 314 within the electron beam chamber 302. A second actuator 320 may also be coupled to the platen 314 to rotate the substrate 101 about a vertical axis of the platen 314. The platen 314 includes an electrode 324 disposed therein. In one embodiment, the electrode 324 is a chucking apparatus, such as an electrostatic chuck, for securing a substrate 101 thereto during processing of the substrate 101. Power from the power source 304 may be utilized to bias the electrode 324 to either chuck the substrate 101 to the electrode 324 or influence bombardment of electrons on the substrate 101.

In operation, a plasma is generated in the electron beam chamber 302 by various bulk and surface processes, for example, by inductive coupling. It is believed that ions generated by an inductively coupled plasma are influenced by an electric field that encourages bombardment of the electrode 322 by the ions generated from the plasma of the inert gas and the process gas. Other plasma generation processes, such as a capacitively coupled arrangement, hollow cathode arrangement, direct current electrode biasing, or electron beam plasma generation processes may be utilized in accordance with the embodiments described herein.

Ion bombardment of the electrode 322 is believed to cause the electrode 322 to emit secondary electrons. Energetic secondary electrons, which have a negative charge, are emitted from the electrode 322. As such, an electron beam 316 is accelerated from the electrode 322 at beam angle θ relative to a datum plane 318 oriented normal to the substrate 101 (i.e., the surface normal s). The electron beam 316 includes, but is not limited to, a spot beam, a ribbon beam, or a full substrate-size beam. The electron beam 316 generated includes one of the substrate etch chemistry, the device material etch chemistry, or the resist etch chemistry dependent on the process gas utilized.

As described herein, the ion beam 216 generated from the angled etch system 200 (e.g., an ion beam etch system) and electron beam 316 generated from the angled etch system 300 (e.g., an electron beam etch system) are collectively described as a beam 516 (as shown in FIGS. 5A-5J) where the beam 516 is one of an ion beam or an electron beam. In embodiments of the method 400, which can be combined with other embodiments described, the beam 516 has one of the substrate etch chemistry, the device material etch chemistry, or the resist etch chemistry at operations of the method 400 described herein. In some embodiments, which may be combined with other embodiments described herein, at least the substrate etch chemistry and resist etch chemistry are different. In other embodiments, which may be combined with other embodiments described herein, at least the device material etch chemistry and resist etch chemistry are different. As described herein, the tunability of etch rates of the resist material 506 and one of a device layer 114 or the substrate 101 and rotation of the substrate 101 form the blazed optical device structures without multiple lithographic patterning steps and angled etch steps.

Figure 4:
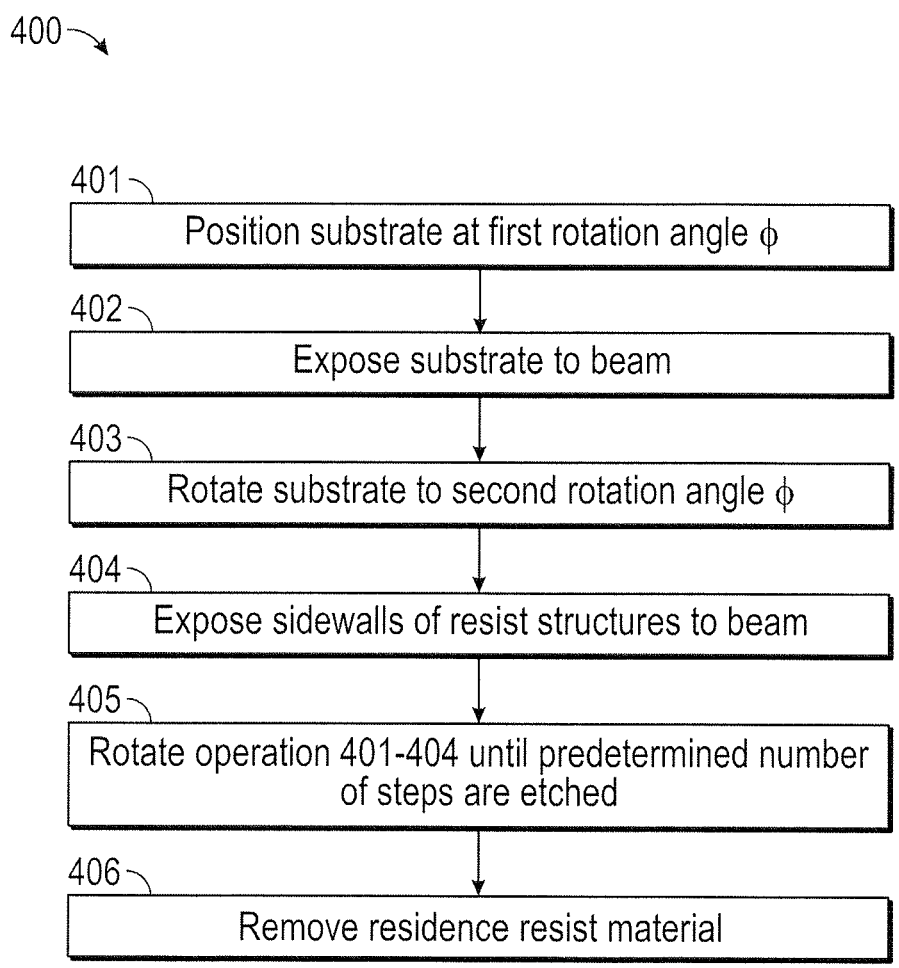
FIG. 4 is a flow diagram of a method for forming a plurality of blazed device structures of an optical device structure according to embodiments described herein.

FIG. 4 is a flow diagram of a method 400 for forming a plurality of blazed device structures 106 of an optical device structure 100 as shown in FIGS. 5A-5E and 5F-5J. FIGS. 5A-5E are schematic, cross sectional views of a portion 501 of a substrate 101 during the method 400. FIGS. 5F-5J are schematic, top views of the portion 501 of the substrate 101 during the method 400.

To facilitate explanation, the method 400 will be described with reference to the angled etch system 200 of FIG. 2 and the angled etch system 300 of FIG. 3. However, it is to be noted that angled etch systems other than the angled etch systems 200, 300 may be utilized in conjunction with method 400. In one embodiment, which can be combined with other embodiments described herein, the portion 501 may correspond to a portion or a whole surface of the substrate 101 of a flat optical device to have the plurality of blazed device structures 106 formed thereon. In another embodiment, which can be combined with other embodiments described herein, the portion 501 may correspond to a portion or a whole surface of the substrate 101 of a waveguide combiner to have the plurality of blazed device structures 106 formed thereon. The portion 501 may correspond to one or more gratings 104. While FIGS. 5A-5E and FIGS. 5F-5J depict etching the substrate 101 such that the blazed device structures 106 are disposed in the substrate, a device layer 114 (as described above) may be disposed on the surface 103 such that the blazed device structures 106 are disposed in the device layer 114.

Figure 5A:
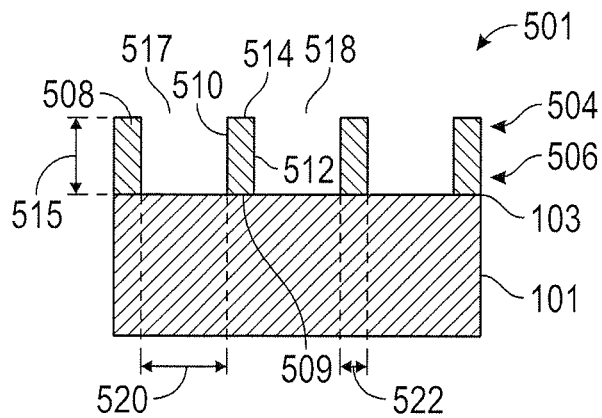
FIGS. 5A-5E are schematic, cross sectional views of a portion of a substrate during a method for forming a plurality of blazed device structures according to embodiments described herein.
Figure 5B:
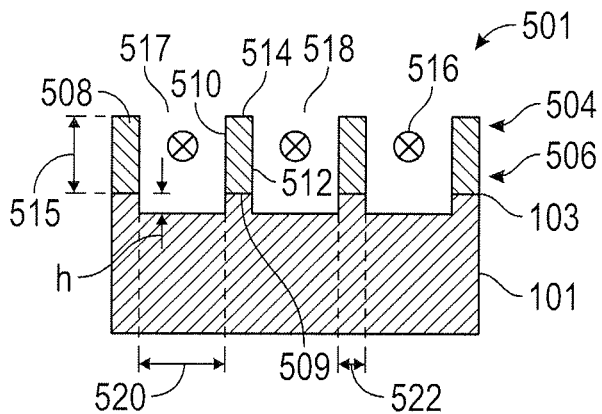
Figure 5C:
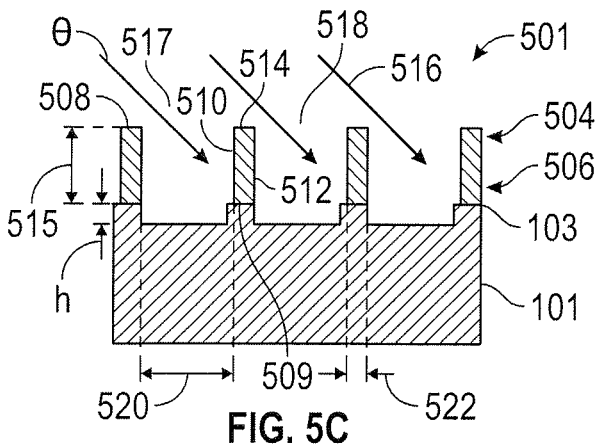
Figure 5D:
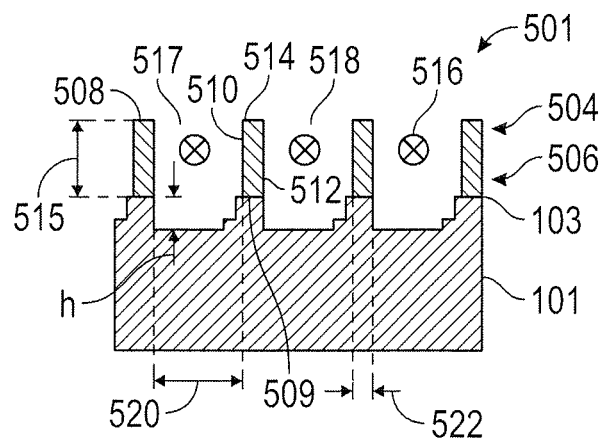
Figure 5E:
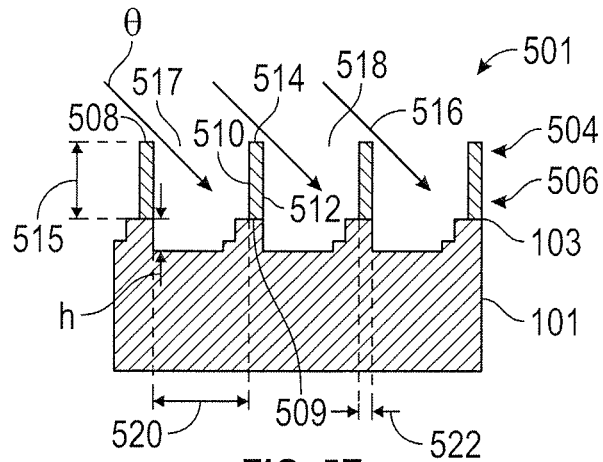
Figure 5F:
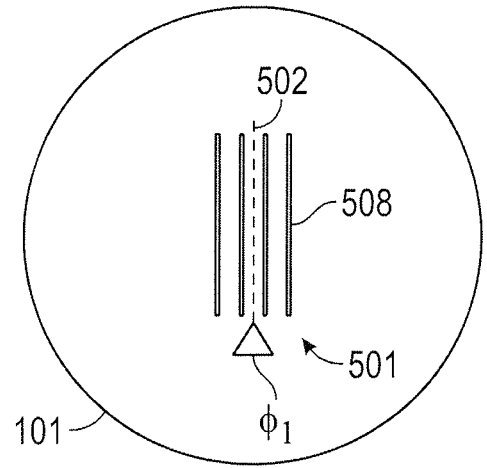
FIGS. 5F-5J are schematic, top views of a portion of a substrate during a method for forming a plurality of blazed device structures according to embodiments described herein.
Figure 5G:
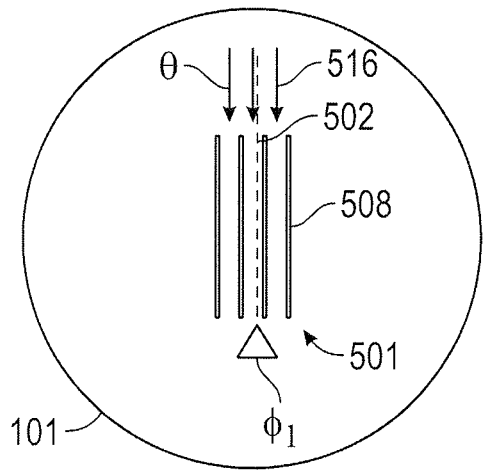

At operation 401, as shown in FIGS. 5A and 5F, a substrate 101 is positioned at a first rotation angle $\phi_1$ as defined by datum line 502, as shown in FIG. 5F. In one embodiment, which may be combined with other embodiments described herein, the first rotation angle $\phi_1$ is 0° defined by datum line 502. The substrate 101 or the device layer 114 (not shown) includes a patterned resist 504 disposed thereon. The pattern resist 504 includes a resist material 506 that is patterned into a plurality of resist structures 508 disposed over a surface 103 of substrate 101. The resist material 506 of the patterned resist 504 is selected based on the substrate etch chemistry (in embodiments in which the substrate 101 is etched to form the blazed device structures 106) or the device material etch chemistry (in embodiments in which the device layer 114 is etched to form the blazed device structures 106). In one embodiment, the resist material 506 is a photosensitive material such that the patterned resist 504 may be patterned by a lithography process, such as photolithography or digital lithography, or by laser ablation process to form the plurality of resist structures 508. In one embodiment, the resist material 506 is an imprintable material that the patterned resist 504 may be patterned by a nanoimprint process to form the plurality of resist structures 508. In another embodiment, which may be combined with other embodiments described herein, the resist material 506 is a hardmask material and the patterned resist 504 is a patterned via one or more etch processes to form the plurality of resist structures 508. In yet another embodiment, which may be combined with other embodiments described herein, the patterned resist 504 is an optical planarization layer.

Each resist structure 508 includes a bottom surface 509, a first sidewall 510, a second sidewall 512, and a top surface 514. Each resist structure 508 has a height 515 from the bottom surface 509 to the top surface 514. Each resist structure 508 has a width 522 from the first sidewall 510 to the second sidewall 512 of the resist structure 508. A plurality of gaps 518 are defined by adjacent resist structures 508. Each of the gaps 518 has a linewidth 520 between the first sidewall 510 and the second sidewall 512 of adjacent resist structures 508. The height 515, the linewidth 520, and the width 522 are selected to tune the number of steps 110 of blazed surface 108 and the linewidth d of the plurality of blazed device structures 106. For example, increasing the height 515 increases the number of repeated intervals of etching the substrate 101 (or device layer 114) and the resist structure 508 such that the number of steps 110 is increased.

At operation 402, the substrate 101 is exposed to the beam 516 at the beam angle θ relative to the surface normal of the substrate 101. In one embodiment, which can be combined with other embodiments described herein, the beam angle θ is about 10 degrees to about 80 degrees relative to the surface normal of the substrate 101. The beam 516 has the substrate etch chemistry or device etch chemistry that is selective to the resist material 506, i.e., exposed portions 517 of the substrate 101 or exposed portions of the device layer 114 (not shown) are removed at a higher rate than the resist material 506. After the beam 516 etches the exposed portions of the substrate 101, at operation 402 (as shown in FIG. 5B) the depth h of the exposed portions 517 corresponding to the blazed device structures 106 is formed.

Figure 5H:
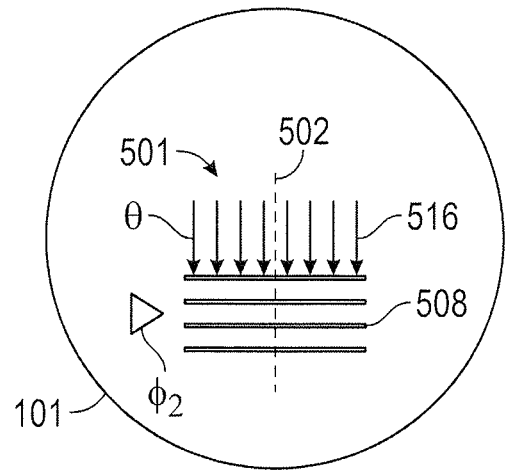

At operation 403, substrate 101 is rotated to a second rotation angle $\phi_2$ defined by datum line 502, as shown in FIG. 5H. In one embodiment, which can be combined with other embodiments described herein, the platen 214, 314 retaining substrate 101 is rotated to a second rotation angle $\phi_2$. In another embodiment, which can be combined with other embodiments described herein, the second rotation angle $\phi_2$ corresponds to 90° relative to datum line 502. The rotating of the substrate 101 is not limited to a rotation angle $\phi$ corresponding to 90° but may correspond to any predetermined angle $\phi$. The rotation enables the beam 516 to contact resist structures 508 due to a shadowing effect. In one embodiment, which can be combined with other embodiments described herein, the beam 516 will remain at a beam angle θ relative to a datum plane 218, 318 oriented normal to the substrate 101 (i.e., the surface normal s) throughout method 400. The constant beam angle allows for the throughput to increase because there will not be a need to reconfigure the beam angle θ. In one embodiment, which can be combined with other embodiments described herein, the method 400 described herein uses only one angled etch system 200, 300 and requires the resist material 506 to only be patterned once to provide for high volume production capability.

At operation 404, the resist structures are exposed to the beam 516 at the beam angle θ. The beam 516 etches one of either the first sidewall 510 or the second sidewall 512, corresponding to which sidewall 510, 512 is exposed to the beam 516. In the embodiment which can be combined with other embodiments described herein, the first sidewall 510 is exposed to the beam 516. The beam 516 has a chemistry corresponding to the resist etch chemistry so that the ions or electrons will only substantially etch the resist structures 508 during the resist etch process. The resist etch chemistry is selective to the substrate 101 or device layer 114, i.e., the resist structures 508 are removed at a higher rate than the device layer 114 or substrate 101. After the beam 516 etches the resist structures 508, the width 522 of resist structure 508 decreases relative to the width shown in FIGS. 5A and 5B. The linewidth 520 between the first sidewall and the second sidewall increases relative to the linewidth shown in FIGS. 5A and 5B.

As shown in FIG. 5C, a first step of the plurality of steps 110 is formed. The plurality of steps 110 forms the blazed surface 108 shown in FIGS. 1B and 1C. The blaze angle γ is the angle between the blazed surface 108 and the surface parallel p of the substrate 101. The blaze angle γ may be achieved by increasing or decreasing the etch rate of beam 516. The adjustments of blaze angle γ may be accomplished by etching at different rates such that depth h, linewidth 520 and width 522 are at predetermined values corresponding to a different number of steps 110 formed on blazed surface 108. Thus, the blaze angle γ may be adjusted and the blazed device structures 106, such as the blazed device structures 106 of a grating 104, may modulate light propagating through the optical device 100 as desired.

Figure 5I:
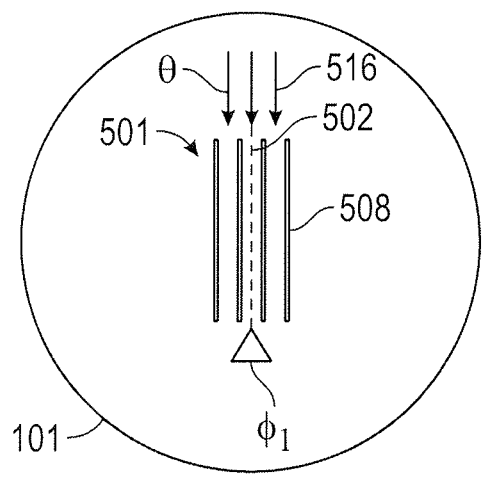
Figure 5J:
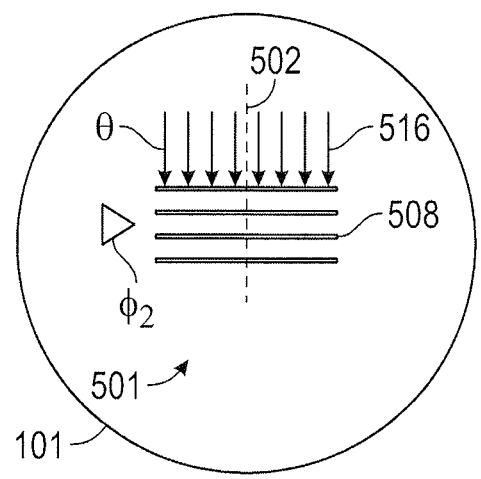

At operation 405, operations 401-404 are repeated until a predetermined number of steps 110 (as shown in FIGS. 1B and 1C) are formed on optical device 100. In one embodiment, which can be combined with other embodiments described herein, the substrate 101 is rotated to the first rotation angle $\phi_1$ and substrate 101 or device layer 114 are etched with the beam 516 until the resist structures 508 are removed or the linewidth 520 of the gaps 518 has a predetermined linewidth. As shown in FIG. 5I, the platen 214, 314 with substrate 101 positioned thereon is rotated to a first rotation angle $\phi_1$. As shown in FIG. 5D, the depth h of the exposed portions 517 corresponding to the blazed device structures 106 increases relative to the depth h shown in FIGS. 5A-5C. As shown in FIG. 5J, the platen 214, 314 with substrate 101 positioned thereon is rotated to a second rotation angle $\phi_2$ defined by datum line 502. After the beam 516 etches the resist structures 508, the width 522 of resist structure 508 decreases relative to the width shown in FIGS. 5A-5D. The linewidth 520 between the first sidewall 510 and the second sidewall 512 increases relative to the linewidth 520 shown in FIGS. 5A-5D. At optional operation 406, residual resist material 506 disposed on the device layer 114 or substrate 101 is removed. While only four resist structures 508 and three gaps 518 are illustrated, the entire patterned resist 504 may be etched such that the desired number of blazed device structures 106 are formed depending on the predetermined design for the optical device 100.

In summation, methods of forming optical device structures are described herein. The methods utilize rotation of a substrate, to have the blazed optical device structures formed thereon, and tunability of etch rates of a patterned resist disposed over the substrate and one of a device layer or the substrate to form the blazed optical device structures without multiple lithographic patterning steps and angled etch steps. The constant beam angle allows for the throughput to increase because there will not be a need reconfigure the beam angle $\vartheta$. Only one angled etch system may be used and the resist material would only need to be patterned once to provide for high volume production capability.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    positioning a substrate at a first rotation angle $\phi_1$ in a path of a beam, the beam configured to be projected to a surface of the substrate at a beam angle $\vartheta$ relative to a surface normal of the substrate, the substrate having a patterned resist formed thereover, the patterned resist comprising:
        two or more resist structures, each of the resist structures having a width; and
        one or more gaps, each of the gaps defined by adjacent resist structures and having a linewidth defined by the adjacent resist structures;
    etching the substrate positioned at the first rotation angle $\phi_1$ with the beam;
    rotating the substrate to a second rotation angle $\phi_2$ and etching sidewalls of the resist structures oriented toward the beam such that the width of the resist structures decreases and the linewidth of the gaps increases;
    rotating the substrate to the first rotation angle $\phi_1$ and etching the substrate at the first rotation angle $\phi_1$ with the beam; and
    forming two or more optical device structures in the substrate, the forming the optical device structures comprising:
        repeating the rotating the substrate to the second rotation angle $\phi_2$ and the etching sidewalls of the resist structures with the beam, and the rotating the substrate to the first rotation angle $\phi_2$ and the etching the substrate with the beam until the resist structures are removed or the linewidth of the gaps has a predetermined linewidth.

2. The method of claim 1, wherein the etching the substrate at the first rotation angle $\phi_1$ comprises generating the beam with a substrate etch chemistry that etches the substrate at a greater rate than the patterned resist.

3. The method of claim 1, wherein the etching the sidewalls of the resist structures comprises generating the beam with a resist etch chemistry that etches the patterned resist at a greater rate than the substrate.

4. The method of claim 1, wherein the first rotation angle $\phi_1$ is 0°.

5. The method of claim 1, wherein the second rotation angle $\phi_2$ is 90°.

6. The method of claim 1, wherein the beam angle $\vartheta$ is about 10° to about 80°.

7. The method of claim 1, wherein the resist structures includes photosensitive, imprintable, optical planarization, or hardmask materials.

8. The method of claim 1, wherein the optical device structures include at least 32 steps.

9. The method of claim 1, wherein the beam is a ribbon beam, a spot beam, or a full substrate-size beam.

10. The method of claim 1, wherein the beam is an ion beam or an electron beam.

11. A method, comprising:
    positioning a substrate at a first rotation angle $\phi_1$ in a path of a beam, the beam configured to be projected to a surface of the substrate at a beam angle $\vartheta$ relative to a surface normal of the substrate, the substrate having a device layer disposed thereon and a patterned resist formed on the device layer, the patterned resist comprising:
        two or more resist structures, each of the resist structures having a width; and
        one or more gaps, each of the gaps defined by adjacent resist structures and having a linewidth defined by the adjacent resist structures;
    etching the device layer with the substrate positioned at the first rotation angle $\phi_1$ with the beam;
    rotating the substrate to a second rotation angle $\phi_2$ and etching sidewalls of the resist structures oriented toward the beam such that the width of the resist structures decreases and the linewidth of the gaps increases;
    rotating the substrate to the first rotation angle $\phi_1$ and etching the device layer at the first rotation angle $\phi_1$ with the beam; and
    forming two or more optical device structures in the device layer, the forming the optical device structures comprising:
        repeating the rotating the substrate to the second rotation angle $\phi_2$ and the etching sidewalls of the resist structures with the beam and rotating the substrate to the first rotation angle $\phi_1$ and the etching the device layer with the beam until the resist structures are removed or the linewidth of the gaps has a predetermined linewidth.

12. The method of claim 11, wherein the etching the device layer comprises generating the beam with a device material etch chemistry that etches the device layer at a greater rate than the patterned resist.

13. The method of claim 12, wherein an etch selectivity of the device material to the patterned resist is about 5:1 or greater.

14. The method of claim 11, wherein the etching the sidewalls of the resist structures comprises generating the beam with a resist etch chemistry that etches the patterned resist at a greater rate than the device layer.

15. The method of claim 14, wherein an etch selectivity of the patterned resist to the device layer is about 10:1 or greater.

16. The method of claim 11, wherein the first rotation angle $\phi_1$ is 0° and the second rotation angle $\phi_2$ is 90°.

17. The method of claim 11, wherein the beam is a ribbon beam, a spot beam, or a full substrate-size beam.

18. The method of claim 11, wherein the optical device structures include at least 32 steps.

19. The method of claim 11, wherein the device layer includes one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), or silicon carbon-nitride (SiCN) containing materials.

20. A method, comprising:
 positioning a substrate at a first rotation angle $\phi_1$ in a path of a beam, the beam configured to be projected to a surface of the substrate at a beam angle $\vartheta$ relative to a surface normal of the substrate, the substrate having a patterned resist formed thereover, the patterned resist comprising:
 two or more resist structures, each of the resist structures having a width; and
 one or more gaps, each of the gaps defined by adjacent resist structures and having a linewidth defined by the adjacent resist structures, wherein:
  the substrate is etched by the beam generated by a substrate etch chemistry; and
  the resist structures are etched by the beam generated by a resist etch chemistry different than the substrate etch chemistry;
 etching the substrate positioned at the first rotation angle $\phi_1$ with the beam generated by the substrate etch chemistry;
 rotating the substrate to a second rotation angle $\phi_2$ and etching sidewalls of the resist structures with the beam at the beam angle $\vartheta$, the beam generated by the resist etch chemistry etching sidewalls of resist structures oriented toward the beam such that the width of the resist structures decreases and the linewidth of the gaps increases;
 rotating the substrate to the first rotation angle $\phi_1$ and etching the substrate at the first rotation angle $\phi_1$ with the beam generated by the substrate etch chemistry; and
 forming two or more optical device structures in the substrate, the forming the optical device structures comprising:
  repeating the rotating the substrate to the second rotation angle $\phi_2$ and the etching sidewalls of the resist structures with the beam generated by the resist etch chemistry, and rotating the substrate to the first rotation angle $\phi_1$ and the etching the substrate with the beam generated by the substrate etch chemistry until the resist structures are removed or the linewidth of the gaps has a predetermined linewidth.

\* \* \* \* \*